United States Patent

Hama

Patent Number: 5,810,688
Date of Patent: Sep. 22, 1998

[54] GUIDE CHAIN

[75] Inventor: Tomio Hama, Ina, Japan

[73] Assignee: Kabushiki Kaisha Harmo Souken, Nagano-ken, Japan

[21] Appl. No.: 864,911

[22] Filed: May 29, 1997

[30] Foreign Application Priority Data

Aug. 2, 1996 [JP] Japan .................................. 8-204591

[51] Int. Cl.⁶ .................................................. F16G 13/02
[52] U.S. Cl. ............................................ 474/207; 474/206
[58] Field of Search .................................. 474/206, 207, 474/209

[56] References Cited

U.S. PATENT DOCUMENTS

| | | | |
|---|---|---|---|
| 4,272,952 | 6/1981 | Graham | 474/207 |
| 4,626,233 | 12/1986 | Moritz | 474/206 |
| 4,863,418 | 9/1989 | Fillar et al. | 474/207 |
| 5,108,350 | 4/1992 | Szpakowski | 474/207 |
| 5,269,129 | 12/1993 | Lundy | 59/78 |
| 5,461,852 | 10/1995 | Nagamatsu | 59/84 |

*Primary Examiner*—William Stryjewski
*Attorney, Agent, or Firm*—Birch, Stewart, Kolasch & Birch, LLP

[57] ABSTRACT

In the guide chain of the present invention, a plurality of chain members are serially connected. The adjacent chain members are pivotably connected to each other. Each of the chain members is formed into a U-shape by resin molding whereby a long member is accommodated in the chain members which have been serially connected. The chain members are molded with a blended resin, which is made by blending a plurality of kinds of resin, and in which reinforcing fillers are added. With the blended resin, surfaces of the chain members are made smooth without projecting reinforcing fillers.

12 Claims, 5 Drawing Sheets

GUIDE CHAIN

BACKGROUND OF THE INVENTION

The present invention relates to a guide chain, which protects a long flexible member, e.g., a cable, a hose, and guides its movement.

The guide chain is employed to hold, protect and guide a long flexible member or members, e.g., cables, hoses, which are provided to a movable part of a machine. The guide chain guides the long flexible members to smoothly move with the movable member of the machine without undesirably bending and entangling the long flexible members. A conventional guide chain has: a plurality of chain members serially connected, the chain members capable of accommodating the long flexible member; and a stopper mechanism for limiting a pivoting angle between the adjacent chain members, which have been pivotably connected to each other, the stopper mechanism provided at a connecting section of the adjacent chain members.

Figure 9:
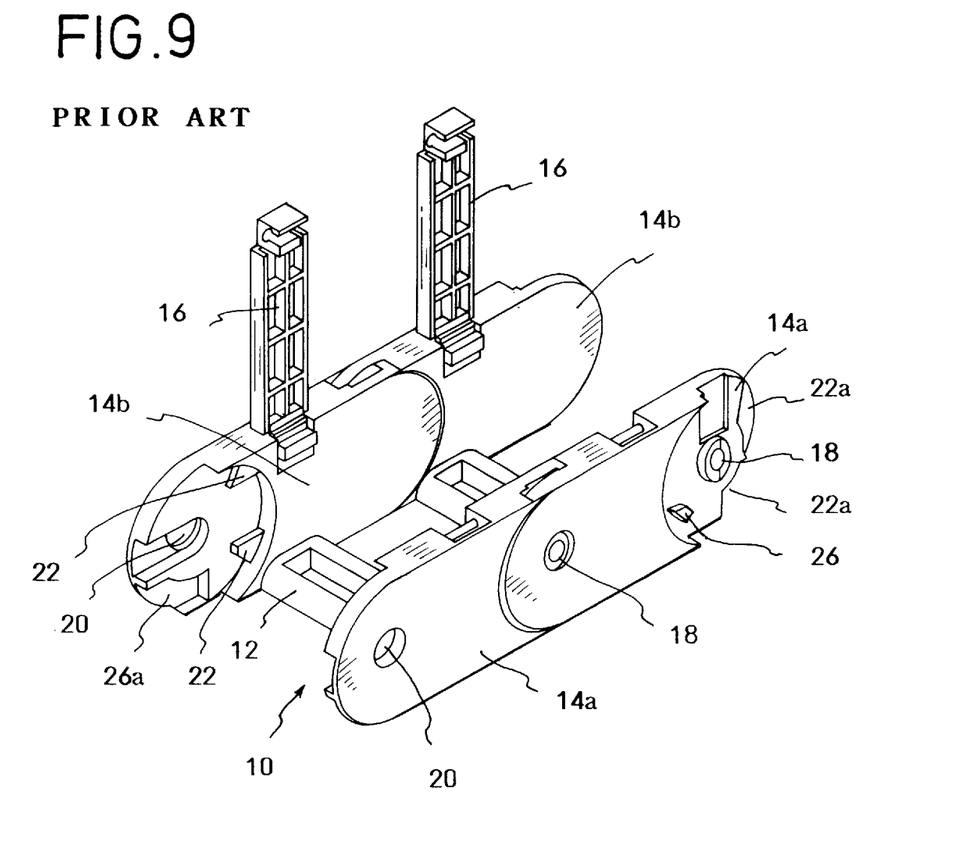
FIG. 9 is a perspective view of a part of the conventional guide chain.

The conventional guide chain is shown in FIG. 9. In FIG. 9, a couple of chain members 10 are pivotably connected to each other. Each chain member 10 includes a pair of side plates 14a and 14b arranged in parallel, and a bottom plate 12 connecting lower ends of the side plates 14a and 14b. With this structure, each chain member 10 is formed into a U-shape. A flap 16 is spanned between upper ends of the side plates 14a and 14b of each chain member 10. The flap 16 is capable of opening and closing an upper opening section between the upper ends of the side plates 14a and 14b. To accommodate the long member in the cable chain, the flaps 16 are opened, the long member is accommodated in inner spaces of the chain members 10, and the flaps 16 are closed.

A plurality of chain members 10 are serially and pivotably connected to each other. In each chain member 10, a pair of axis holes 20 are respectively formed in a forward section of each side plate 14a and 14b; a pair of axes 18 are respectively outwardly projected from an outer side face of a rear section of each side plate 14a and 14b. The axes 18 are capable of pivotably fitting in the axis holes 20 of an adjacent chain member 10, so that a plurality of the chain members 10 can be serially and pivotably connected to each other.

To limit a pivoting angle between the adjacent chain members 10, the stopper mechanism is provided therebetween. The stopper mechanism of each chain member 10 comprises: a pair of stopper claws 22, each of which is provided on an inner face of the front section of each side plate 14a and 14b; a pair of stopper grooves 22a, each of which is formed in an outer face of the rear section of each side plate 14a and 14b. The stopper claws 22 are capable of engaging with the stopper grooves 22a of the adjacent chain member 10. Note that, in FIG. 9, another pair of stopper claws 26 are respectively provided on the outer face of the rear sections of the side plates 14a and 14b of each chain member 10; another pair of stopper grooves 26a are respectively formed in the inner face of the front section of the side plates 14a and 14b of each chain member 10. The stopper claws 26 are also capable of engaging with the stopper grooves 26a of the adjacent chain members 10.

When the chain members 20 are mutually connected and rotating about the axes 18, the stopper claws 22 and 26 are capable of rotating, within a prescribed angle, in the stopper grooves 22a and 26a, respectively. The bending angle of the guide chain is limited when the stopper claws 22 and 26 contact the ends of the stopper grooves 22a and 26a respectively. Thus, the long member or members in the guide chain are smoothly guided and prevented from overbending.

By means of the stopper mechanisms of the chain members 10, the pivoting angle between the adjacent chain members 10 are limited, so that the long members in the guide chain can be prevented from overbending and breaking. The pivoting angle of the chain members 10 is previously defined, so the chain members 10 must be changed when the pivoting angle is changed. Therefore, many kinds of chain members 10 must be prepared according to the pivoting angle.

The chain members 10 are usually made by resin molding. The chain members 10 are repeatedly moved, so they must have enough durability. To improve the durability, the chain members 10 are molded with resin to which reinforcing fillers, e.g., glass fibers, are added. However, by molding the chain members 10 with said resin, surfaces of the molded chain members 10 are made rough from the reinforcing fillers. Namely, the reinforcing fillers are projected from the surfaces of the chain members 10 (see FIG. 2). The resin crystallizes and shrinks when the resin is cooled and solidified; the reinforcing fillers do not shrink when the resin is cooled and solidified. So the surfaces of the chain members 10 are made rough by projecting reinforcing fillers therefrom.

If the chain members 10 having rough surfaces are employed, the long flexible members, e.g., the cables, the hoses, are abraded from the hard reinforcing fillers which project from the surfaces of the chain members 10. The long flexible members are accommodated and moved several million times, for example, together with the guide chain. Therefore, the long flexible members become abraded from in the guide; they are gradually damaged and finally broken by the projected fillers. Today's guide chains are moved at high speed, so the durability of the guide chains must be improved. The durability can be improved by increasing the amount of the reinforcing fillers, but the flexible members are apt to be damaged by the fillers.

In the conventional guide chain made by resin molding, the durability can be improved but the long flexible members are apt to be highly damaged.

Improvement of the durability of the connecting sections between the chain members 10 and pivotable base sections of the flaps 16 are also required.

SUMMARY OF THE INVENTION

An object of the present invention is to provide a guide chain, which is capable of changing the pivoting angle between the adjacent chain members without exchanging the chain members.

Another object of the present invention is to provide a guide chain, which has higher durability and which does not damage a long member accommodated therein.

To achieve the objects, the guide chain of the present invention has following structures.

A first basic structure of the guide chain comprises: a plurality of chain members serially connected, the adjacent chain members pivotably connected to each other, each the chain member is formed into a U-shape by resin molding whereby a long member is accommodated in the chain members which have been serially connected, wherein the chain members are molded with a blended resin, which is made by blending a plurality of kinds of resin, and in which reinforcing fillers are added, whereby surfaces of the chain members are made smooth without projecting reinforcing fillers.

With the first basic structure, the long member in the guide chain can be prevented from damage by the reinforcing fillers. Furthermore, the amount of reinforcing fillers can be increased without projecting from the surfaces of the chain members, so the durability of the guide chain can be highly improved.

In the guide chain, the reinforcing fillers may be glass fibers.

In the guide chain, the blended resin may include: aliphatic polyamide; and aromatic polyamide.

A second basic structure of the guide chain comprises:
a plurality of chain members serially connected, each of chain member including:
  a pair of side plates arranged in parallel;
  a bottom plate connecting lower ends of the side plates whereby the chain member is formed into a U-shape;
  a pair of axis holes, each of which is formed in one section of each of the side plate; and
  a pair of axes, each of which is outwardly projected from an outer side face of another section of each of the side plate, the axes capable of respectively fitting in the axis holes whereby the adjacent chain members are pivotably connected to each other;
a pair of stopper holes respectively formed in the side plates of each of the chain member;
a pair of stopper claws respectively provided on each the axes, each stopper claw movably accommodated in each of the stopper hole whereby a pivoting angle between the adjacent chain members is limited;
a pair of caps respectively detachably attached to the side plates of each of the chain members, each of the caps capable of closing the axis hole and the stopper hole of each of the side plates.

With the second basic structure, dust entering between the adjacent chain members can be prevented by the caps, so that the guide chain can be moved and bent smoothly.

In the guide chain, each of the cap may have stopper pieces, which are accommodated in each of the stopper hole of each of the side plate, and which is capable of limiting movement of the stopper claw. With this structure, the pivoting angle between the adjacent chain members can be changed by only exchanging the caps. Furthermore, noise can be reduced.

In the guide chain, each of the stopper claws may be radially extended from an outer circumferential face of each of the axes, and each the stopper hole may be a fan-shaped hole, in which the stopper claw can be moved, and which is communicated with each of the axis hole. By the fan-shaped holes, the pivoting angle can be defined.

In the guide chain, each of the chain member may further include a flap, which is spanned between upper ends between the side plates, each end being pivotably attached to the upper ends of the side plates, and which is capable of opening from each end. With this structure, the long member can be accommodated in the guide chain easily.

In the guide chain, each of the chain member may further include a partition, which is formed on the bottom plate, and which is capable of engaging with the flap and dividing the long members, which are accommodated in the chain members, which are serially pivotably connected. With this structure, a plurality of long members can be divided in the guide chain.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Embodiments of the present invention will now be described by way of examples and with reference to the accompanying drawings, in which.

DETAILED DESCRIPTION OF THE PREFERRED EMBODIMENTS

Preferred embodiments of the present invention will now be described in detail with reference to the accompanying drawings.

In the present embodiment, chain members of a guide chain are made by resin molding, e.g., injection molding. The chain members are serially connected to each other. The chain members have enough durability. Surfaces of the chain members have smooth faces, so the guide chain is capable of guiding and protecting long flexible members without damage. The chain members are made from resin, in which reinforcing fillers are added, but the reinforcing fillers do not projected from the surfaces of the molded chain members of the guide chain.

To prevent the reinforcing fillers from projecting from the surfaces of the molded chain members, the chain members are molded with blended resin including: aliphatic polyamide, which has been used for making the conventional chain members; and another resin, e.g., aromatic polyamide, which covers volume loss of the aliphatic polyamide when the blended resin is cooled and solidified. By using the blended resin for molding the chain members, the surfaces of the molded chain members are made smoothly without projecting reinforcing fillers. In the present embodiment, the aliphatic polyamide and the aromatic polyamide are employed as the blended resin, but other combinations, which are capable of mutually covering the volume loss, can be employed as the blended resin.

Figure 1:
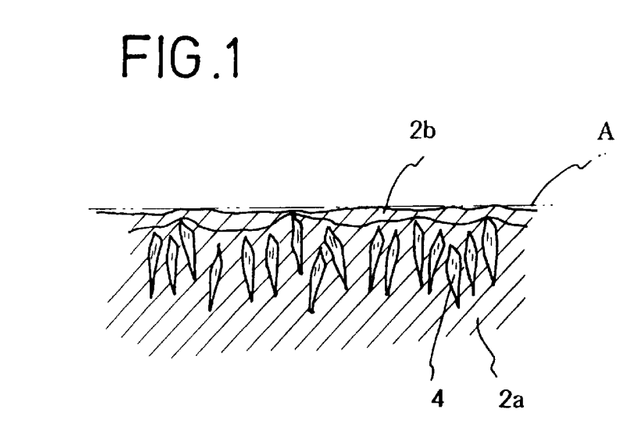
FIG. 1 is a sectional view in the vicinity of a surface of a resin molded chain member of an embodiment.
Figure 2:
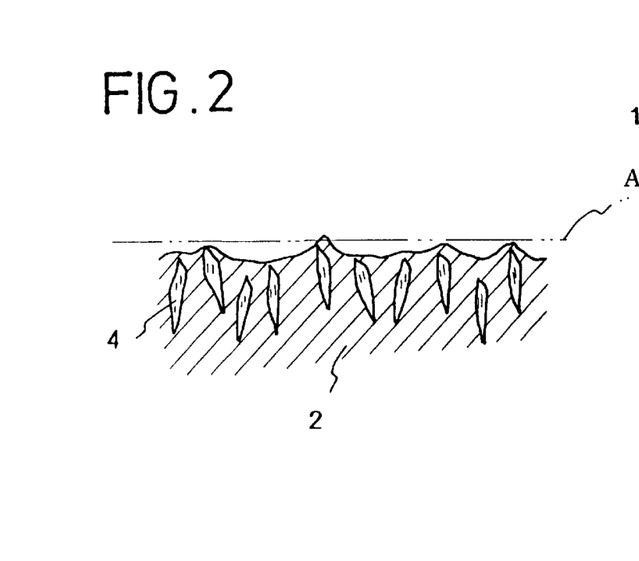
FIG. 2 is a sectional view in the vicinity of a surface of a resin molded chain member of a conventional guide chain.

In the present embodiment, glass fillers are added to the blended resin, which includes the aliphatic polyamide and the aromatic polyamide, as the reinforcing fillers. Namely, the chain members are molded with said blended resin, in which the glass fillers have been added. FIG. 1 is a sectional view in the vicinity of the surface of the chain member of the present embodiment; FIG. 2 is a sectional view in the vicinity of the surface of the conventional chain member.

In FIG. 2, a two-dot chain line "A" corresponds to a molding faces of a molding dies. The conventional chain member is molded with the aliphatic polyamide 2 only, so the resin 2 shrunk when the resin 2 is cooled and solidified in the molding die. By the volume loss of the resin 2, the surface of the chain member is located under the line "A"; the glass fillers 4 in the resin 2 do not shrink when the resin 2 is cooled and solidified. So the fillers 4 are left and projecting from the surface of the chain member. By projecting the glass fillers 4 from the surface of the chain member, the conventional chain member has a rough surfaces. Long flexible members, e.g., cables, hoses, in the conventional guide chain are abraded and damaged by the rough surfaces or the projected hard fillers 4.

On the other hand, in the present embodiment, the chain member is molded with the blended resin, which includes, for example, the aliphatic polyamide 2a and the aromatic polyamide 2b (see FIG. 1). Even if the aliphatic polyamide 2a shrinks when the blended resin is cooled and solidified in the molding dies, the aromatic polyamide 2b, which does not shrink, covers the volume loss of the aliphatic polyamide. By covering the volume loss, the surface of the chain member is located along the line "A", and the glass fillers 4 are not projected from the surface of the chain member; the chain member has flat smooth surfaces like a mirror surface. With the flat smooth surfaces, the long flexible members in the guide chain are not abraded and damaged by the glass fillers 4.

In the present embodiment, the surfaces of the molded chain members have a luster despite the glass fillers included in the blended resin. Unlike the conventional chain members having rough surfaces with the projected fillers 4, the chain members of the present embodiment have very smooth surfaces.

In the present embodiment, even if the amount of the reinforcing fillers in the blended resin is increased more than that in the conventional chain members, the long flexible members cannot be damaged by the fillers. According to results of a comparative test, the long flexible member accommodated in the guide chain of the present embodiment can be used several times as long as the long flexible member accommodated in the conventional guide chain. Furthermore the amount of the reinforcing fillers can be increased in the present embodiment, so the durability of the guide chain can be improved.

The blended resin of the present embodiment includes the aliphatic polyamide and the aromatic polyamide. Both are crystalline polymers, both have enough compatibility, and both do not form into eutectic crystals around melting points. The aromatic polyamide delays crystallization of the aliphatic polyamide. The aromatic polyamide is crystallized without shrinking when the aliphatic polyamide is crystallized and shrunk, so that injecting pressure of an injection molding machine can effectively work the blended resin. With enough injection pressure, the blended resin which has been melted can be fully filled in the molding dies. By fully filling in the molding dies, if the molding faces of the molding dies are flat smooth mirror like faces, the surfaces of the molded products (the chain members) can be flat smooth faces.

A combination of the blended resin is not limited to the combination of the aliphatic polyamide and the aromatic polyamide. Other combinations of two or more kinds of resin, which have said characteristic of covering volume loss, can be employed as the blended resin. Namely, the reinforcing fillers can be fully covered with the blended resin, so that the surfaces of the molded products can be flat smooth mirror like faces.

In the present embodiment, the glass fillers have been employed as the reinforcing fillers, but other fillers, e.g., mineral fillers, can be employed as the reinforcing fillers.

The shape of the reinforcing fillers is not limited to needle-shapes (see FIG. 2), other shapes, e.g., rectangular shapes, ball-shapes, can be employed.

Unlike the needle-shaped glass fillers, the mineral fillers, the rectangular shaped fillers, the ball-shaped fillers do not damage the long flexible members. However, in the present embodiment, the reinforcing fillers can be fully covered with the resin layer, so the needle-shaped glass fillers, which are capable of highly improving the durability of the molded chain members, can be employed as the reinforcing fillers.

Figure 3:
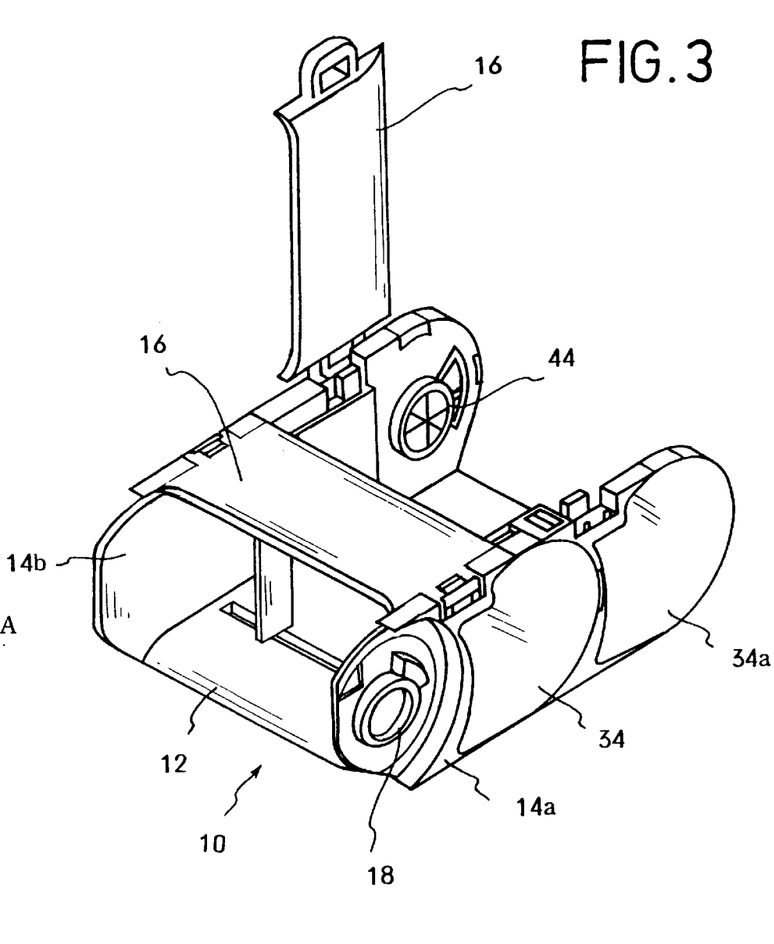
FIG. 3 is a perspective view of a part of the guide chain of the embodiment.

The chain members of the present embodiment are shown in FIGS. 3–8. FIG. 3 is a perspective view of two chain members 10, which are serially connected.

The chain member 10 is formed into a U-shape as well as the conventional chain member (see FIG. 9). Namely, the chain member 10 has: a pair of side plates 14a and 14b, which are arranged in parallel; and a bottom plate 12, which connects lower ends of the side plates 14a and 14b. Further, a flap 16 is spanned between upper ends between the side plates 14a and 14b. Each end of the flap 16 is pivotably attached to the upper ends thereof, and the flap 16 is capable of opening from each upper end. In FIG. 3, one of the flaps 16 is opened from the upper end of the side plate 14a.

Figure 4:
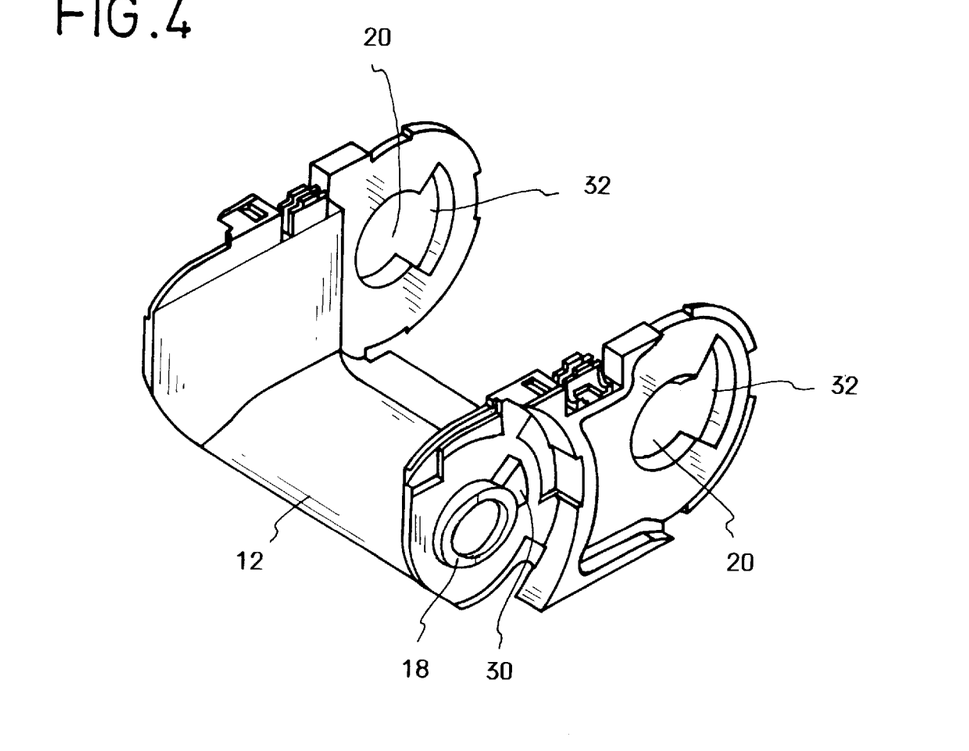
FIG. 4 is a perspective view of the chain member of the embodiment.

FIG. 4 is a perspective view of the chain member 10. An axis hole 20 is formed in a rear section of each side plate 14a and 14b. An axis 18 is outwardly projected from an outer side face of a forward section of each side plate 14a and 14b, and the axes 18 are capable of respectively fitting in the axis holes 20, so that the adjacent chain members 10 can be pivotably connected to each other. Note that, in the present embodiment, the axes 18 are provided in the forward sections of the side plates 14a and 14b; the axis holes 20 are formed in the rear sections of the side plates 14a and 14b. However, the axes 18 may be provided in the rear sections of the side plates 14a and 14b; the axis holes 20 may be formed in the forward sections of the side plates 14a and 14b. The inner diameter of each axis hole 20 is designed to slidably fit the axis 18 therein.

A pair of stopper holes 32 are respectively formed in the side plates 14a and 14b. A pair of stopper claws 30 are respectively provided on each axis 18, and each stopper claw 30 is movably accommodated in each stopper hole 32, so that the pivoting angle between the adjacent chain members 10 can be limited. As shown in FIG. 4, the stopper holes 32 are formed into fan-shaped holes and respectively communicated with the axis holes 20. The radius of the fan-shaped stopper holes 32 is greater than that of the axis holes 20. By the fan-shaped stopper holes 32, the stopper claws 30 can be circumferentially moved in the stopper holes 32, so that the pivoting angle between the adjacent chain members 10 can be defined by the fan-shaped stopper holes 32.

A pair of caps 34 are respectively detachably attached to the side plates 14a and 14b of each the member 10. Each cap 34 is capable of closing the axis hole 20 and the stopper hole 32 of each side plate 14a and 14b so as to cover the connecting section, which includes the axis 18 and the axis hole 20, between the adjacent chain members 10 (see FIG. 3). Each cap 34 has stopper pieces 40a and 40b (see FIGS. 5 and 6), which are capable of being respectively accommodated in each stopper hole 32 of each side plate 14a and 14b when the caps 34 are respectively attached to the side plates 14a and 14b. By accommodating the stopper pieces 40a and 40b in the stopper holes 32, the circumferential movement of the stopper claws 30 in the stopper holes 32 is limited, so that the pivoting angle between the adjacent chain members 10 can be defined.

Figure 5:
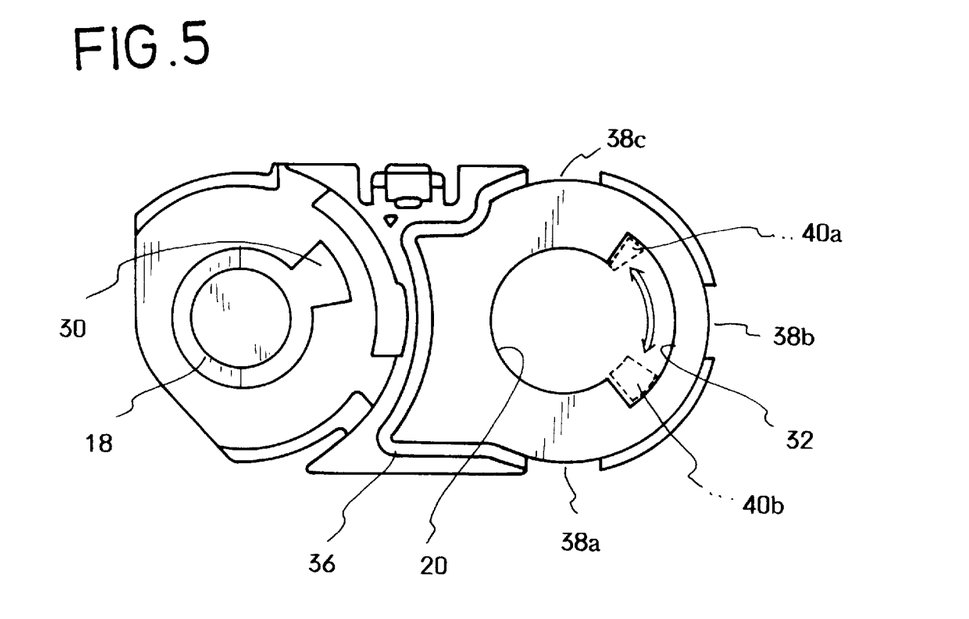
FIG. 5 is a side view of the chain member of the embodiment.

A side view of the chain member 10 is shown in FIG. 5. Each stopper claw 30 is radially extended from an outer circumferential face of each axis 18, and each stopper hole 32 is the fan-shaped hole, in which the stopper claw 30 can be moved, and which is communicated with each axis hole 20. Cap cavities 36 are respectively formed in an outer face of each side plate 14a and 14b. The caps 34 can be fitted in the cap cavities 36. Notches 38a, 38b and 38c are formed in each side plates 14a and 14b so as to engage with the cap 34.

Figure 6A:
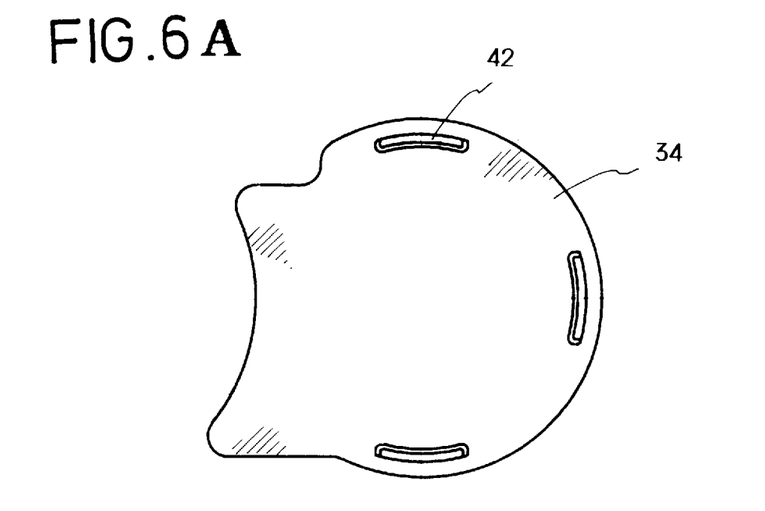
FIG. 6A is a front view of a cap.
Figure 6B:
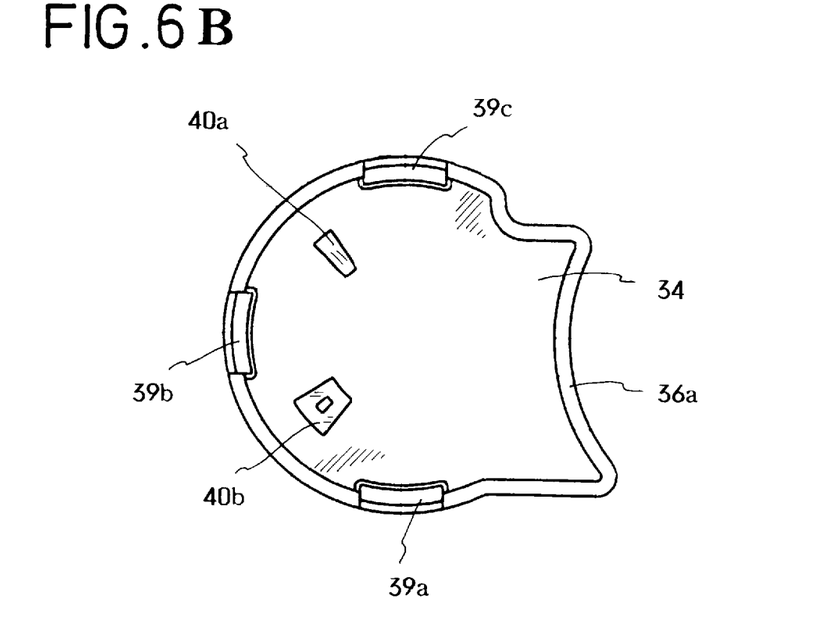
FIG. 6B is a rear view of the cap.

FIG. 6A is a front view of the cap 34; FIG. 6B is a rear view of the cap 34. The shape of the cap 34 for the side plate 14a and the shape of the cap 34 for the side plate 14b are mutually symmetric. The cap 34 shown in FIGS. 6A and 6B is attached to the side plate 14a, which is shown in FIG. 5.

As shown in FIG. 6A, holes 42 for detaching the cap 34 from the side plate are formed in each cap 34. As shown in FIG. 6B, the cap 34 has a engaging edge 36a, which is capable of fitting with the cap cavity 36 of the side plate, and engaging sections 39a, 39b and 39c, which are capable of engaging with the notches 38a, 38b and 38c of the side plate. The stopper pieces 40a and 40b are accommodated in the stopper hole 32 of the side plate. In the present embodiment, the stopper pieces 40a and 40b correspond to both ends, in the circumferential direction, of the fan-shaped stopper hole 32. The stopper pieces 40a and 40b in the stopper hole 32 are shown by dotted lines in FIG. 5. By the stopper pieces 40a and 40b, the rotational angle of the stopper claw 30 is limited to the angle shown by an arrow (see FIG. 5) by the stopper pieces 40a and 40b. With this structure, the pivoting angle between the adjacent chain members 10 can be limited.

The caps 34 can be attached to and detached from the chain member 10, so the pivoting angle between the adjacent chain members 10 can be changed by exchanging the caps 34 in which positions of the stopper pieces 40a and 40b are changed. In the present embodiment, sizes of the axis hole 20 and the stopper hole 32 are greater than sizes of the axis hole and the stopper hole of the conventional chain members so as to make the pivotable angle of the chain members 10 wider. With the wide pivotable angle, the pivoting angle of the chain members 10 can be variously defined by the caps 34.

In the present embodiment, the diameter of the axes 18 are relatively greater, so toughness of the connecting sections of the adjacent chain members 10 can be improved, and the durability of the guide chain can be improved. Since the stopper claws 30 contact the stopper pieces 40a and 40b, noise caused by colliding the stopper can be reduced. In the conventional guide chain, the stopper claws 30 directly contact the chain member proper, so the chain member proper resonantes, and the noise is amplified. On the other hand, in the present embodiment, the chain member proper does not resonate because the stopper claws 30 contact the stopper pieces 40a and 40b, so that the noise can be reduced.

In FIG. 3, the caps 34a are attached to the chain member 10 at an end of the guide chain. The end chain member 10 is fixed to a machine by metallic parts. In the present embodiment, the caps 34a respectively have attaching shafts 44, each of which is pierced through the axis hole 20 of the side plate and inwardly projected therefrom. The metallic parts can be connected with the attaching shafts 44.

In the conventional guide chain, stopper members are outwardly and inwardly projected from the side plates, so various kinds of metallic parts for fixing the end chain member are required according to the attaching manner. On the other hand, in the present embodiment, a structure of a part connecting to the machine can be common, so common metallic parts can be used to fix the end chain member 10 to the machine.

Figure 7:
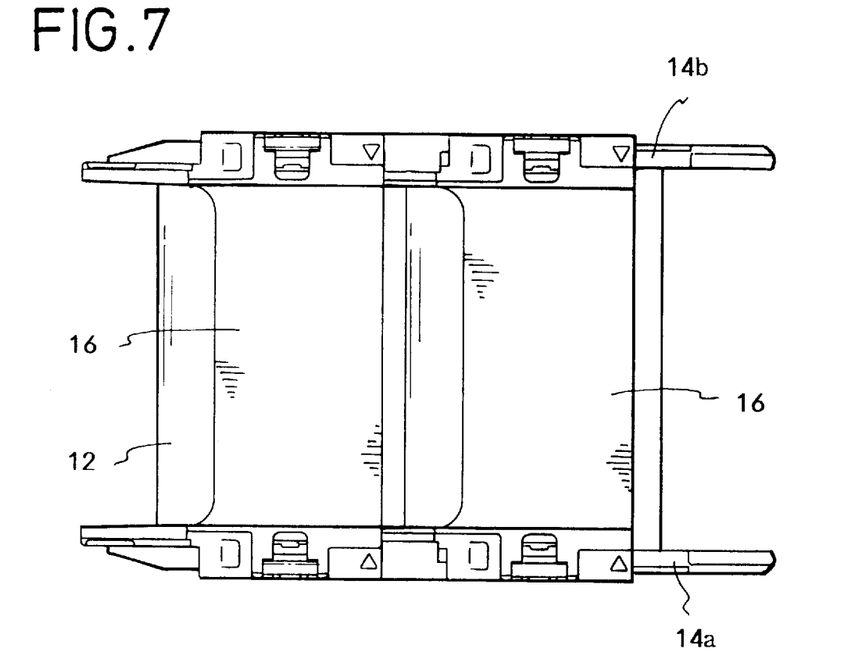
FIG. 7 is a plan view of the part of the guide chain.

In FIG. 7, the flaps 16 are closed. Shapes of the flaps 16 can be optionally designed. The flaps 16 may be provided with proper separations; the flaps 16 may be provided with no separations. In the present embodiment, the bottom plates 12 of the adjacent chain members 10 are slightly overlapped so as not to form gaps between the bottom plates 12 of the adjacent chain members 10. Shapes of the bottom plates 12 also may be designed optionally.

Figure 8:
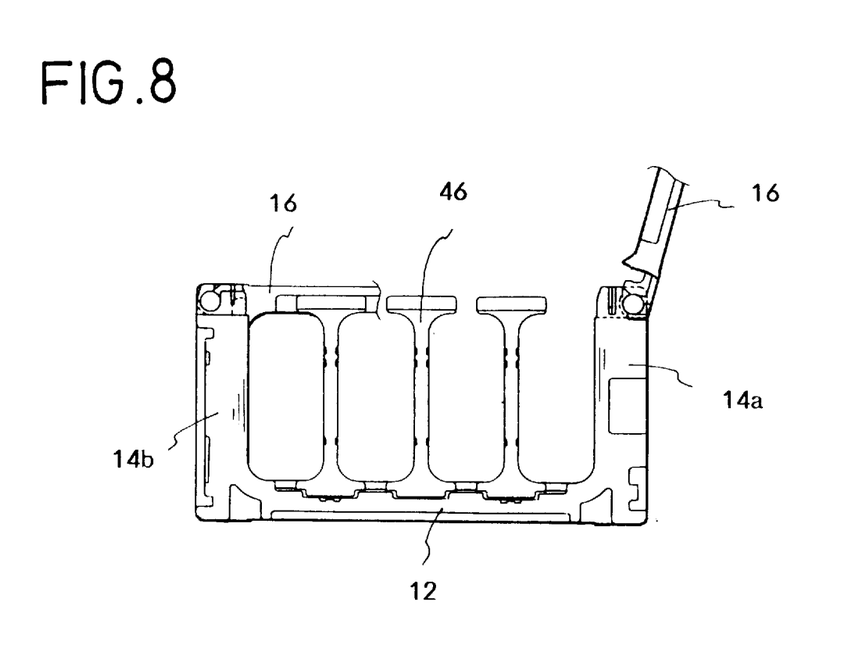
FIG. 8 is a side view of a chain member of another embodiment.

Another embodiment is shown in FIG. 8. In FIG. 8, there are provided a plurality of partitions 46 on the bottom plate 12. The partitions 46 divides the long flexible members according to, for example, types of cables. Grooves are formed in an upper face of each bottom plate 12, and lower ends of the partitions 46 are fitted in the grooves. Furthermore, grooves are formed on an inner face of each flap 16, and upper ends of the partitions 46 are fitted in the grooves. With this structure, the partitions 46 are held at prescribed positions by the bottom plate 12 and the flap 16.

In the above described embodiments, parting lines, which correspond to parting faces of the resin molding dies, are not formed on inner faces of the chain members 10 to prevent damaging the long flexible members. Furthermore, corners of each chain member 10 are made round to prevent damaging the long flexible members.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A guide chain, comprising a plurality of chain members serially connected, said adjacent chain members pivotably connected to each other, each said chain member formed into a single, unitary U-shape by resin molding, the chain members for receiving therein a long member
   wherein said chain members are molded with a blended resin, which is made by blending a plurality of kinds of resin, and in which reinforcing fillers are added,
   surfaces of said chain members being smooth without projecting reinforcing fillers.

2. The guide chain according to claim 1, wherein said reinforcing fillers are glass fibers.

3. The guide chain according to claim 1, wherein said blended resin includes aliphatic polyamide and aromatic polyamide.

4. The guide chain according to claim 3, wherein said reinforcing fillers are glass fibers.

5. A guide chain, comprising:
   a plurality of chain members serially connected, each said chain member including:
      a pair of side plates arranged in parallel;
      a bottom plate connecting lower ends of said side plates whereby said chain member is formed into a U-shape;
      a pair of axis holes, each of which is formed in one section of each said side plate; and
      a pair of projecting axes, each of which is outwardly projected from an outer side face of another section of each said side plate, said axes capable of respectively fitting in said axis holes whereby said adjacent chain members are pivotably connected to each other;

a pair of stopper holes respectively formed in said side plates of each said chain member;

a pair of stopper claws respectively provided on each said axis, each stopper claw movably accommodated in each said stopper hole whereby a pivoting angle between said adjacent chain members is limited;

a pair of caps respectively detachably attached to said side plates of each said chain member for closing said axis hole and said stopper hole of each said side plate.

6. The guide chain according to claim 5, wherein each said cap has stopper pieces formed thereon for being accommodated in each said stopper hole of each said side plate, said stopper pieces for engaging said stopper claws for limiting movement of said stopper claws.

7. The guide chain according to claim 5, wherein each said stopper claw is radially extended from an outer circumferential face of each said axis, and wherein each said stopper hole is a fan-shaped hole, in which said stopper claw is movable, and which is communicated with each said axis hole.

8. The guide chain according to claim 5, wherein each said chain member further includes a flap, which is spanned between upper ends thereof between said side plates, each end being pivotably attached to the upper ends of said side plates, and which is capable of opening from each end.

9. The guide chain according to claim 8, wherein each said chain member further includes a partition, which is formed on said bottom plate, and which is capable of engaging with said flap, said partition for separating adjacent long members, which are accommodated in said chain members.

10. The guide chain according to claim 5, wherein the chain members are molded with a blended resin, which is made by blending a plurality of kinds of resin, and in which reinforcing fillers are added, surfaces of said chain members being smooth without projecting reinforcing fillers.

11. The guide chain according to claim 10, wherein said reinforcing fillers are glass fibers and said blended resin includes aliphatic polyamide and aromatic polyamide.

12. The guide chain according to claim 5, wherein the chain members are molded into a single, unitary U-shape.

* * * * *